Patented Feb. 21, 1928.

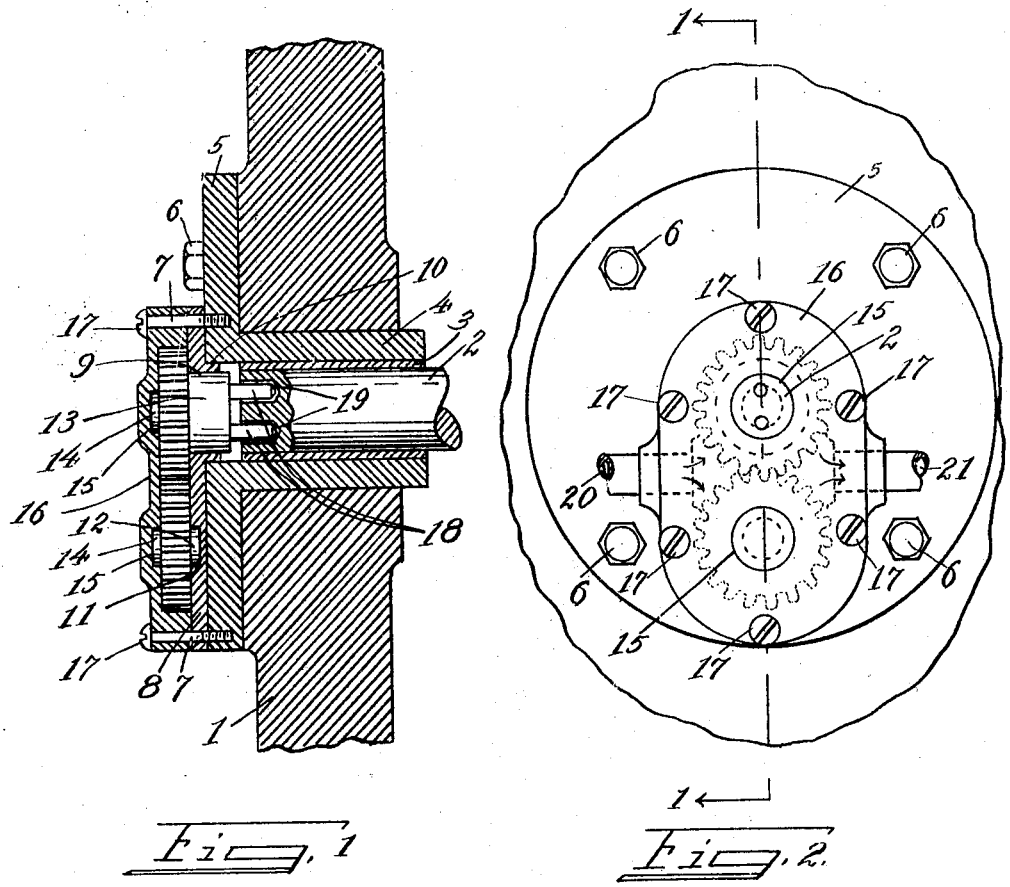

1,660,287

UNITED STATES PATENT OFFICE.

GEORGE E. WILLERS, OF LAWRENCEBURG, INDIANA, ASSIGNOR TO A. D. COOK, INC., OF LAWRENCEBURG, INDIANA, A CORPORATION OF INDIANA.

GEAR PUMP.

Application filed December 18, 1924. Serial No. 756,649.

My invention relates to gear pumps and particularly to that class actuated by driven shafts of pumps or other machinery.

It is the object of my invention to provide a gear pump particularly for pumping oil or other liquid which may be easily attached to the bearing of a driven shaft and which is simple in construction, easy to adjust and repair, rugged and durable in use, and very economical to operate. These several objects I accomplish by the novel construction hereinafter described and claimed. Referring to the drawings forming part of this specification,—

Figure 1 represents a vertical cross section of my device taken along the lines 1—1 in Figure 2. Figure 2 is a front view showing the inlet and outlet of the liquid which is pumped.

The pump or engine frame generally indicated at 1 has a driven shaft 2 on which the bushing 3 of any anti-friction metal is mounted. Surrounding the bushing there is a sleeve 4 in which the bushing has bearing, which for the particular requirements of a rigid setting for my pumps, I have provided with a flange 5, and I have cast the sleeve integral with the flange. This sleeve forming the bearing for the shaft is shown as being attached to the pump frame by machine bolts 6. Over the flange of the bearing and with holes 7 matching the threaded holes in it there is attached a plate 8 which has an opening 9 in axial alignment with the axis of the driven shaft. As a further support for this plate an annular shoulder 10 is fitted into the opening in the flange of the bearing. This plate has another hole 11 which provides the journal bearing for the support of the hub 12 of the driven gear in the gear pump. Two meshing gears are provided which have hubs extending out from them, the driving gear having a hub 13 of larger diameter than that of the driven gear and which fits into the collar of the base plate axially aligned with the shaft 2. This construction is of particular importance as it provides a wide bearing surface in the place where it is most needed as will be hereinafter shown. The meshing gears are journaled on the outside by hubs 14 of similar size, which fit into holes 15 in the exterior cover plate 16. The meshed gears are thus snugly fitted into openings in the cover plate which is firmly secured to the base plate by threaded bolts 17. The oil pump is driven by studs or pins 18 which extend inwardly from the large hub of the driven gear and which fit into holes 19 which are drilled into the rotating shaft in aligned position. The liquid to be pumped enters the pump from an opening in the cover plate 20 which is extended for threaded connection with any desired size of pipe. Opposed to the inlet is another extension 21 of the cover plate which is also extended for threaded connection with any desired sized pipe.

The simplicity of construction of my device is shown by the fact that five castings can be made which provide for the entire mechanism. There is the flanged sleeve,—the base plate,—the driving gear,—the driven gear and the cover plate. Much of the wear on the pump parts is carried by the large hub of the driving gear journaled in the shoulder of the base plate, but for purpose of repair, when it is necessary, all that need be done is to remove the cover plate and replace the worn part. Uneven wear on the gears may also be equalized by removing the cover plate and reversing the driven gear by putting the outside hub into the opening in the base plate where the inner hub had previously been rotating.

Having thus described the particular construction of my invention which I desire to secure by Letters Patent, what I claim is:

In a device of the character specified, in combination with a rotatable shaft, and a member surrounding an end of said shaft, a detachable pump assembly comprising a base plate and a cover plate with a driving gear having a hub journaled in said base plate, with means connected with said hub forming a driving connection with said rotatable shaft, and means for detachably mounting said assembly on said member surrounding the end of said shaft, with a driven gear also journaled within said base plate and said cover plate, with a depression in said cover plate and an equally sized depression in said base plate with said driven gear journaled in said depressions, said gear reversible in position within said assembly.

GEORGE E. WILLERS.